US009217418B2

(12) United States Patent
Bodewes et al.

(10) Patent No.: US 9,217,418 B2
(45) Date of Patent: Dec. 22, 2015

(54) WIND FARM ISLAND OPERATION (75) Inventors: Florentius Joannes Bodewes, Dordrecht (NL); Franciscus Leonardus Hendricus Strik, Amerongen (NL)

(73) Assignee: XEMC Darwind B.V., Hilversum (NL)

( * ) Notice: Subject to any disclaimer, the term of this patent is extended or adjusted under 35 U.S.C. 154(b) by 848 days.

(21) Appl. No.: 13/262,774

(22) PCT Filed: Apr. 6, 2010

(86) PCT No.: PCT/EP2010/054524
§ 371 (c)(1),
(2), (4) Date: Mar. 6, 2012

(87) PCT Pub. No.: WO2010/112616
PCT Pub. Date: Oct. 7, 2010

(65) Prior Publication Data
US 2012/0146423 A1   Jun. 14, 2012

(30) Foreign Application Priority Data
Apr. 3, 2009  (EP) ..................... 09157298

(51) Int. Cl.
*H02J 3/00* (2006.01)
*F03D 9/00* (2006.01)
(Continued)

(52) U.S. Cl.
CPC .................. *F03D 9/005* (2013.01); *H02M 7/49* (2013.01); *F05B 2240/96* (2013.01);
(Continued)

(58) Field of Classification Search
CPC ....... H02J 3/00; H02H 11/003; H02H 11/002; H02H 9/047; H02H 3/18; H03K 17/063; F03D 9/05
See application file for complete search history.

(56) References Cited

U.S. PATENT DOCUMENTS 5,686,766 A  11/1997 Tamechika
6,670,721 B2  12/2003 Lof
(Continued)

FOREIGN PATENT DOCUMENTS

CN  101228351 a  7/2008
CN  101309002  11/2008
(Continued)

OTHER PUBLICATIONS

Official Search Report and Written Opinion of the European Patent Office in counterpart foreign application No. PCT/EP2010/054524 filed Apr. 6, 2010.
(Continued)

*Primary Examiner* — Rexford Barnie
*Assistant Examiner* — Terrence Willoughby
(74) *Attorney, Agent, or Firm* — Steven M. Koehler; Westman, Champlin & Koehler, P.A.

(57) ABSTRACT

A method and a system are described for island operation of at least two wind turbines associated with a wind farm, wherein said wind farm is configured for providing power generated by wind turbines in said wind farm to a main grid and wherein the method comprises: detecting at least two or more deactivated wind turbines in said wind farm, said deactivated wind turbines being disconnected from said main grid; configuring at least one islanded local grid for electrically connecting said two or more deactivated wind turbines; activating at least one of said deactivated wind turbine using a black start operation; and, connecting said at least one activated wind turbine and at least one of said deactivated wind turbines to said local grid, said activated wind turbine acting as a power supply for said at least one deactivated wind turbine connected to said local grid.

16 Claims, 6 Drawing Sheets (51) Int. Cl.
*H02M 7/49* (2007.01)
*H02J 3/38* (2006.01)

(52) U.S. Cl.
CPC .. *F05B 2270/107* (2013.01); *F05B 2270/1074* (2013.01); *H02J 2003/388* (2013.01); *Y02E 10/72* (2013.01); *Y02E 10/76* (2013.01); *Y10T 307/718* (2015.04)

(56) References Cited

U.S. PATENT DOCUMENTS

| | | | |
|---|---|---|---|
| 7,394,166 | B2 | 7/2008 | Teichmann |
| 7,808,126 | B2 * | 10/2010 | Stiesdal ............ 307/84 |
| 8,000,840 | B2 * | 8/2011 | Nielsen ............ 700/286 |
| 2003/0011348 | A1 | 1/2003 | Lof |
| 2005/0225090 | A1 | 10/2005 | Wobben |
| 2006/0214428 | A1 * | 9/2006 | Altemark et al. ............ 290/44 |
| 2007/0093978 | A1 | 4/2007 | Walling |
| 2008/0084070 | A1 | 4/2008 | Teichmann |
| 2008/0224541 | A1 * | 9/2008 | Fukuhara ............ 307/48 |
| 2008/0284172 | A1 | 11/2008 | Nielsen |
| 2009/0001815 | A1 | 1/2009 | Kohler |
| 2009/0317250 | A1 * | 12/2009 | Gamble et al. ............ 416/1 |

FOREIGN PATENT DOCUMENTS

| | | |
|---|---|---|
| EP | 0677911 | 10/1995 |
| EP | 1429025 | 6/2004 |
| EP | 1780861 | 5/2007 |
| EP | 1909371 | 4/2008 |

OTHER PUBLICATIONS

State Intellectual Property Office of the People's Republic of China, Date of Notification Sep. 9, 2013, Notification of the First Office Action.
State Intellectual Property Office of the People's Republic of China for corresponding Chinese application 201080022233.1, Notification of the Second Office Action, date of notification Jun. 12, 2014.
Communication pursuant to Article 94(3) EPC dated Aug. 18, 2015 for corresponding foreign application EP 09157298.2, filed Apr. 3, 2009.

* cited by examiner

WIND FARM ISLAND OPERATION

CROSS-REFERENCE TO RELATED APPLICATION

This application is a Section 371 National Stage Application of International Application PCT/EP2010/054524 filed Apr. 6, 2010 and published as WO/2010/112616 in English.

FIELD OF THE INVENTION

Aspects of the invention relate to wind farm island operation and, in particular, though not exclusively, to a method and a controller for island operation of at least two wind turbines associated with a wind farm, said wind farm being configured for providing power generated by wind turbines in said wind farm to a main grid, a wind turbine and a wind farm system using such controller and a computer program product for executing such method.

BACKGROUND OF THE INVENTION

The discussion below is merely provided for general background information and is not intended to be used as an aid in determining the scope of the claimed subject matter.

Wind turbine technology and in particular offshore wind turbine technology is a rapidly developing field of technology. At offshore locations higher wind speeds are available and installation of larger size wind turbines are possible when compared with the onshore systems. The installation and operations of such wind parks provide some technological challenges. The wind turbines are floating or installed on a submarine foundation and are electrically interconnected with submarine power transmission lines. Moreover, such wind parks are typically installed in relatively remote areas, hence the control system of the wind farm and/or the control system in each wind turbine of the wind farm should be able to take measure when problems occur during operation.

One of the problems faced in wind farm operations relates to so-called islanding. Islanding is a situation which may occur if the wind farm or part of the wind turbines of the wind farm becomes disconnected from the electrical grid, e.g. because of planned switching action or protective switching of a circuit breaker in the grid. For example after detection of a power failure circuit breakers may automatically disconnect one or more turbines from the grid. Thereafter, each disconnected wind turbine sets itself to a parking or standby state by stopping rotation of the blades and by pitching the blades. The standby state will last until the islanded wind farm can be reconnected to the grid. During this state, the wind turbine controller and other turbine components, e.g. the environmental controller which controls the environmental parameters (temperature, humidity, etc.) of the wind turbine installation to stay within the requested limits, may be supplied with power from an auxiliary power source.

A conventional wind farm turbine typically uses an uninterruptible power supply (comprising e.g. a battery system, super capacitors and/or a diesel generator set) as the auxiliary power source. Diesel generators however require maintenance and refueling and are thus less suitable for use in offshore and/or remote wind farm systems. Moreover, batteries are sensitive to temperature changes and—in order to ensure a power supply over a long duration—typically a large number of batteries is required. Hence, there is a need in the prior art for improved standby operation of a group of islanded wind turbines.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A first aspect of the invention is a method of island operation of at least two wind turbines disconnected from the main grid. The method may comprise: configuring a local grid, said local grid being disconnected and/or electrically isolated from the main grid; activating at least one of said deactivated wind turbines; and/or electrically coupling the activated wind turbine and at least one deactivated wind turbine to the local grid, the activated wind turbine acting as a power supply for the deactivated wind turbine.

In particular, an aspect of the invention may relate to a method for island operation of at least two wind turbines associated with a wind farm, said wind farm may be configured for providing power generated by wind turbines in said wind farm to a main grid and wherein the method may comprise: detecting at least two or more deactivated wind turbines in said wind farm, said deactivated wind turbines being disconnected from said main grid; configuring at least one islanded local grid for electrically connecting said two or more deactivated wind turbines; activating at least one of said deactivated wind turbine using a black start operation; and, connecting said at least one activated wind turbine and at least one of said deactivated wind turbines to said local grid, said activated wind turbine acting as a power supply for said at least one deactivated wind turbine connected to said local grid.

The operational wind turbine thus acts as an auxiliary power supply, which may either be a supplemental auxiliary power supply to the auxiliary power supply of each wind turbine or a main auxiliary power supply replacing the auxiliary power supply of each of the wind turbines. The method thus provides an efficient and cheap way of supplying power to an islanded group of wind turbines. The method is especially effective when deactivation of large groups of wind turbines over a longer period is necessary, for example during grid maintenance or defects. Moreover, the method reduces the necessity of using combustion type generator sets.

In one embodiment the local grid may be configured by controlling one or more first switches in the one or more power transmission lines between said deactivated wind turbines. In a further embodiment coupling between the activated wind turbine and the at least one deactivated wind turbines may be established by controlling one or more second switches providing an electrical connection between said local grid and said activated and deactivated wind turbines respectively. In another embodiment each wind turbine comprises a wind generator and/or an auxiliary power distribution system, said wind generator and/or auxiliary power distribution system being connectable to the local grid using one or more third switches. In yet another embodiment said auxiliary power distribution system is further connectable to an uninterruptible power supply using one or more fourth switches. By controlling switches, e.g. circuit breakers or high voltage switches equivalent to such circuit breakers, in the power transmission network and/or the wind turbines, the operational (activated) wind turbine may be simply supply power to the deactivated wind turbines. Moreover, the auxiliary power supply of the wind generator may be used for short term power supply events, e.g. for black-starting a deactivated wind turbine. For longer periods the activated wind turbine provides the necessary power for electrical components in the wind turbine, e.g. the wind turbine controller and the climate controller of the wind turbine.

In a further embodiment at least one of said wind turbines comprise a wind turbine controller, said wind turbine controller being configured for executing at least one process step of: configuring a local grid disconnected from the main grid; activating at least one of said deactivated wind turbines; and/or coupling the activated wind turbine and at least one deactivated wind turbine to the local grid, the activated wind turbine acting as a power supply for the deactivated wind turbine. In this embodiment the deactivated wind turbines isolated from the main grid may autonomously activate a deactivate wind turbine and connect the auxiliary supply lines of the other deactivated to said activated wind turbine which acts as an auxiliary power supply.

In one embodiment a deactivated wind turbine may comprise wind blades which are pitched into vane position.

In another embodiment each of said wind turbines comprises a wind turbine controller, said wind turbine controllers being connected via one or more communications links to a wind farm controller configured for executing at least one process step of: configuring a local grid disconnected from the main grid; activating at least one of said deactivated wind turbines; and/or coupling the activated wind turbine and at least one deactivated wind turbine to the local grid, the activated wind turbine acting as a power supply for the deactivated wind turbine. In this embodiment the standby operation of the deactivated wind turbines is centrally managed by the wind farm controller, which is connected via a telecommunications network to the wind turbines in the wind farm. Using the telecommunications network the wind farm controller may collect operational information, e.g. deactivation events and/or power- or system failures, from said wind turbines and may individually control the wind turbines on the basis of the collected operational information.

In a further aspect the invention relates to a controller for island operation of two or more deactivated wind turbines disconnected from the main grid, wherein the controller may comprise at least: one or more detectors for detecting isolation of a wind turbine from the main grid and/or deactivation of said wind turbine; means for configuring a local grid, said local grid being disconnected and/or electrically isolated from the main grid; a wind turbine activator for activating at least one of said deactivated wind turbines; and/or coupling means for electrically coupling the activated wind turbine and at least one deactivated wind turbine to the local grid.

In one variant said means for configuring a local grid may comprise a first switch controller for controlling one or more first switches in the one or more power transmission lines between wind turbines identified by said one or more detectors. In a further variant said coupling means may comprise a second switch controller for controlling one or more second switches for providing an electrical connection between said local grid and said activated and deactivated wind turbines respectively.

In yet another variant, the controller may comprise a receiver/transmitter unit for establishing a communications link with at least one of said deactivated wind turbines disconnected from the main grid or with a wind farm controller.

In further aspects the invention relates to a wind turbine comprising a controller as described above and to a wind farm system configured for managing island operation of two or more deactivated wind turbines in said wind farm system, wherein said deactivated wind turbines being disconnected from the main grid and wherein the wind farm may comprise a plurality of wind turbines switchable connected through one or more power transmission lines to a main grid and at least one controller as described above.

An aspect of the invention also relate to a computer program product comprising software code portions configured for, when run in the memory of computer or a controller such as wind farm controller or a wind turbine controller, executing at least one of the method steps as described above.

Aspects of the invention will be further illustrated with reference to the attached drawings, which schematically will show embodiments according to the invention. It will be understood that the invention is not in any way restricted to these specific embodiments.

DETAILED DESCRIPTION

Figure 1:
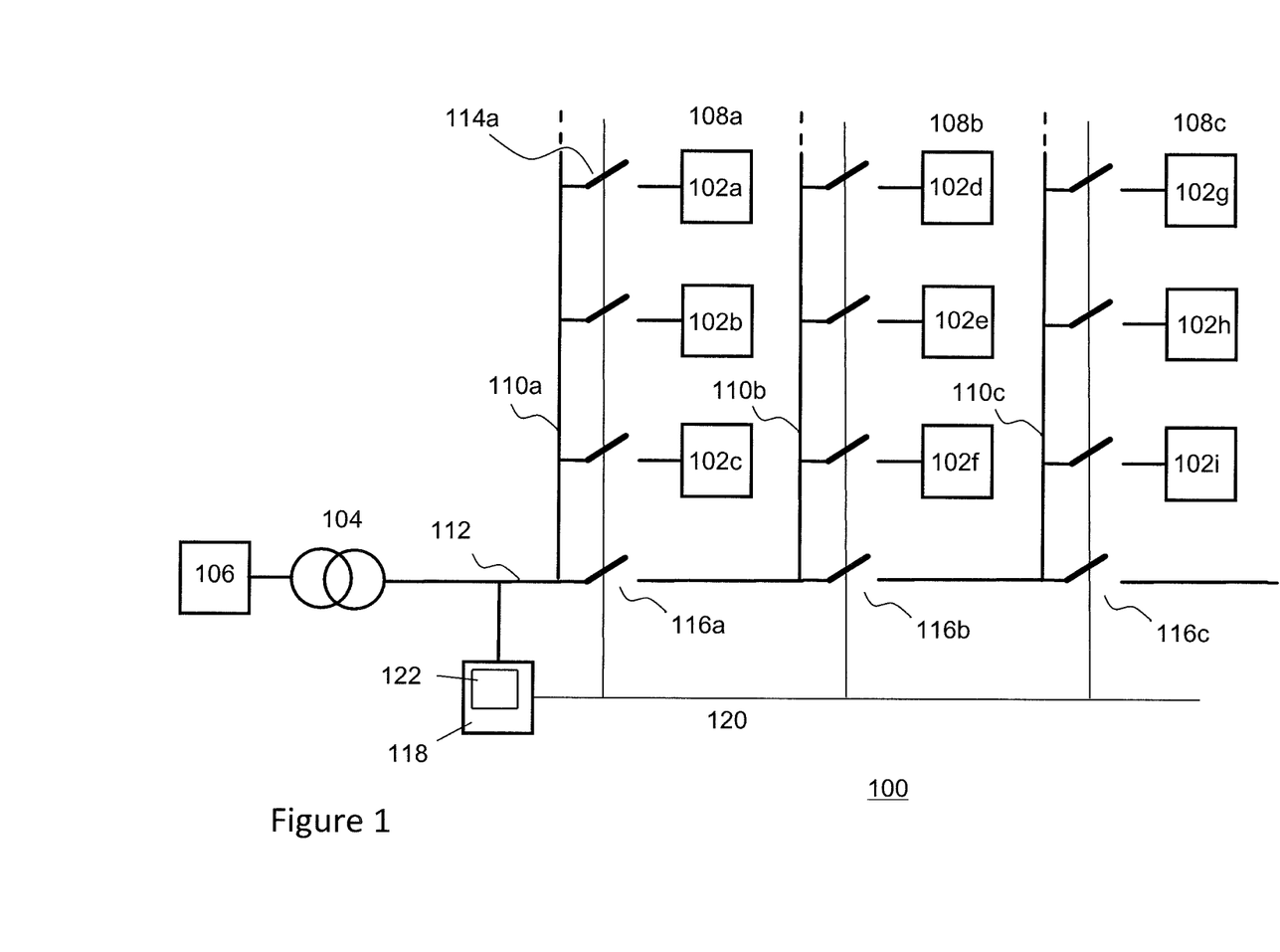
FIG. 1 depicts a schematic of a wind farm system according to one embodiment of the invention.

FIG. 1 depicts a schematic of an exemplary wind farm system 100 according to one embodiment of the invention. The wind farm comprises a plurality of wind turbines 102a-102i connected via one or more switches, e.g. circuit breakers, and one or more (substation) transformers 104 to an external power transmission system (i.e. the main power grid, typically the public power grid) 106, e.g. a three phase 50 or 60 Hz power grid, or a high voltage direct current (HVDC) link. The wind turbines of the wind farm may be electrically interconnected using a local power transmission system (i.e. the local grid) which may comprise power transmission lines 110a-110c and one or more main power transmission lines 112 for connecting the wind farm system to the external power transmission system. In the embodiment of FIG. 1 the wind turbines may be arranged in linear arrays 108a-108c ("strings"), however other interconnecting arrangement well known in the art are also possible. For example in a further embodiment (not shown), the wind turbines may be arranged in a closed ring configuration or a star configuration.

In order to protect the wind farm system from damages due to power and/or system failures or to controllably disconnect the wind farm or part of the wind farm various switches 114a-114i, 116a-116c are provided in the power transmission lines. These switches are configured to controllably disconnect either one or more individual wind turbines, one or more strings of wind turbines and/or other configurations of groups of wind turbines from the main grid. In the embodiment of FIG. 1 each wind turbine may be connected via a switch 114a-114i to a power transmission line of the local grid. A wind farm controller 118 may be connected to the main power transmission line and to the switches in the wind farm system. The wind farm controller may be connected via a bi-directional data link 120 to the wind turbine controllers and the switches in the wind farm system. Electrical sensing units in the wind farm system (not shown) may detect and locate voltage drops, power and/or system failures in the wind farm system and report such drops and/or failures to the wind park controller. In response to the information provided by the sensing units the wind park controller may—as a safety measure—remotely deactivate the operation of one or more wind turbines in the wind farm.

Figure 2:
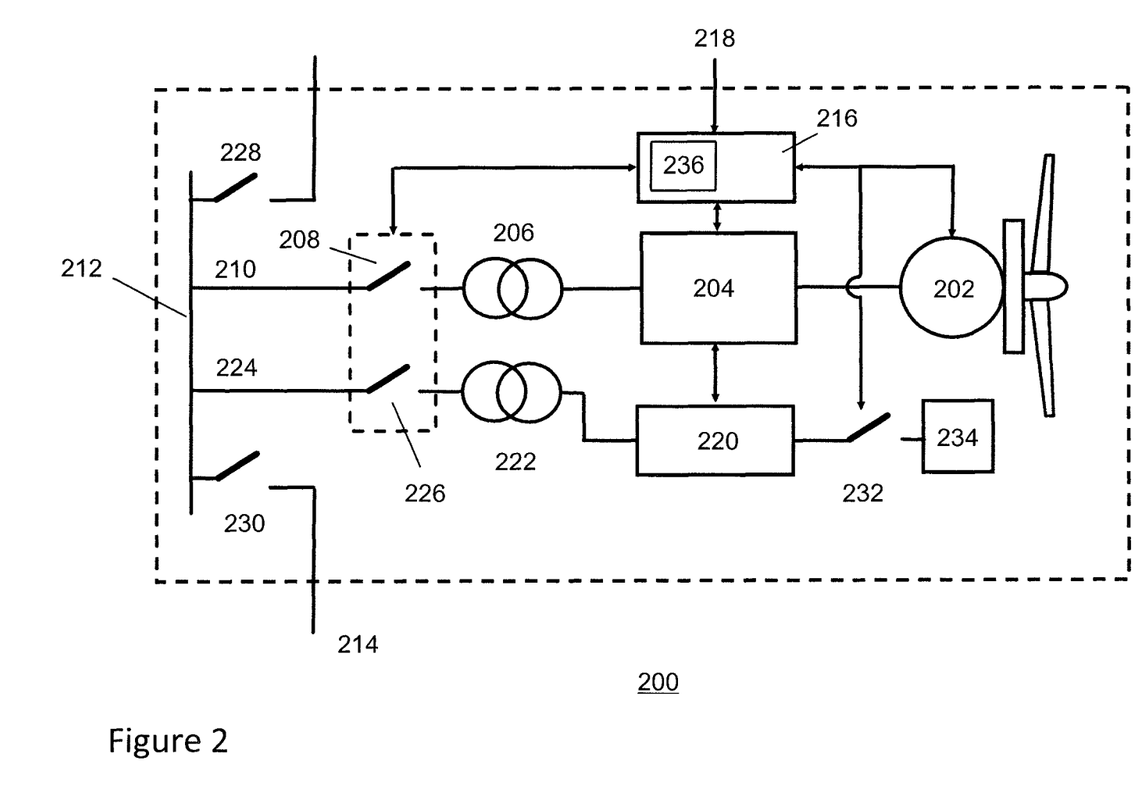
FIG. 2 depicts a schematic of the main components of a wind turbine.

FIG. 2 depicts a schematic of the main components of an exemplary wind turbine 200 used in a wind park as depicted in FIG. 1. The wind turbine comprises a generator 202, e.g. a permanent magnet (PM) generator or a synchronous or asynchronous type generator, which transforms the rotary energy of the blades into a variable frequency ac electrical power. The output of the generator is fed into a converter 204 typically comprising an inverter for converting the ac power to a dc power and an inverter for converting the dc power into an ac power of a frequency used by the main grid. Preferably, converter 204 relates to a self-commutated inverter well known in the art. Such self-commutated inverter is configured for generating a stable ac output signal without requiring synchronization of the output signal to an external source.

The output of the convertor is connected via a main transformer 206, a main switch 208, a main bus bar 210 and a common bus bar 212 to the local grid 214. The wind turbine is controlled by the wind turbine controller 216. The controller may collect operational data (e.g. power level, temperature, wind speed, conversion efficiency, etc.) and use these operational data to control the wind turbine such that optimal operation of the wind turbine is achieved.

Further, the wind turbine controller comprises a transmitter/receiver unit for providing a data link 218 with the other controllers (wind turbine and/or wind farm) in the wind farm system. In one embodiment, the wind turbine controllers of the wind turbines of the wind farm form a communications network, wherein a wind turbine controller may transmit operational, sensory and/or control data via the communications network to the wind farm controller and/or to the wind turbine controllers of other wind turbines in the wind farm.

The wind turbine further comprises a low voltage auxiliary power distribution system 220 which is connected via an auxiliary transformer 222 and an auxiliary bus bar 224 to the common bus bar 212. The auxiliary power distribution system provides a low power supply for the electrical components, such as the wind turbine controller and the environmental control system (heating and cooling systems) in the wind turbine. The auxiliary power distribution system may be connected or disconnected from the local grid using a local grid switch 226. During normal operation the local grid switch may be closed so that the auxiliary power distribution system is fed by the local grid.

The auxiliary power distribution system may be connected to the local grid in various ways. In one variant (not shown) instead of a separate main and auxiliary transformer a double secondary winding transformer may used wherein the auxiliary power distribution system may be connected to the secondary coil. In a further variant, the main switch and the local grid switch may implemented as a single switch controlled by the wind turbine controller.

If a wind turbine controller and/or the wind farm controller detects a power fault, it may disconnect—as a protective measure—one or more wind turbines from local grid by opening the main switch 208 and the grid switch 226 of a predetermined number of wind turbines. During disconnection, further switches e.g. secondary switches 228,230 may be opened providing further electrical isolation of the wind turbine from the grid. Each of the (high voltage) switches and/or high speed circuit breakers may be controlled (opened/closed) by the wind turbine controller, wind farm controller and/or protective devices.

When the circuit breakers are opened, the wind turbine controller may set the wind turbine in a standby mode by stopping the rotation of the turbine and by pitching the wind blades in the vane position. A wind turbine in the standby mode (hereafter referred to as a "deactivated" wind turbine) is disconnected from the main grid. Hence in order to ensure continuous standby operation of the wind turbine the auxiliary power distribution system 220 may be connected by a power supply switch 332 to an uninterruptible power supply (UPS) 234. Typically the UPS comprises a system of batteries, super capacitors and/or a diesel generator set installed in or near the wind turbine.

The wind turbine controller may be further configured for black-starting the wind turbine if it is in its deactivated state. Such black-start procedures are well known in the art (see for example U.S. Pat. No. 7,394,166 describing an exemplary wind turbine black start procedure). If the controller is triggered to start a black-start procedure, it may use the power provided by the UPS in order to pitch the wind blades out of the vane position and to gradually increase the power operation until stable open-circuit operation is achieved.

Information on the deactivated wind turbines may be collected by the wind turbine controller and transmitted via the data link 218 to the wind farm controller and/or to the wind turbine controllers of other wind turbines in the wind farm. Hence, the wind farm controller and/or the one or more wind turbine controllers of the wind turbines are able exchange information regarding their operation status and to detect and locate which wind turbines are isolated from the main grid.

When the disconnected wind turbines are required to stay in the standby mode over a longer period of time, the UPS may run out of power. In order to prevent such an undesirable situation, the wind turbine controller and/or the wind farm controller may further comprise an island mode control unit (IMCU) 122,236 which is adapted to detect one or more deactivated wind turbines which are disconnected from the grid and to initiate an island operation process in response to the detection of deactivated wind turbines. The island operation process is described in more detail with reference to FIGS. 3 and 4.

Figure 3A:
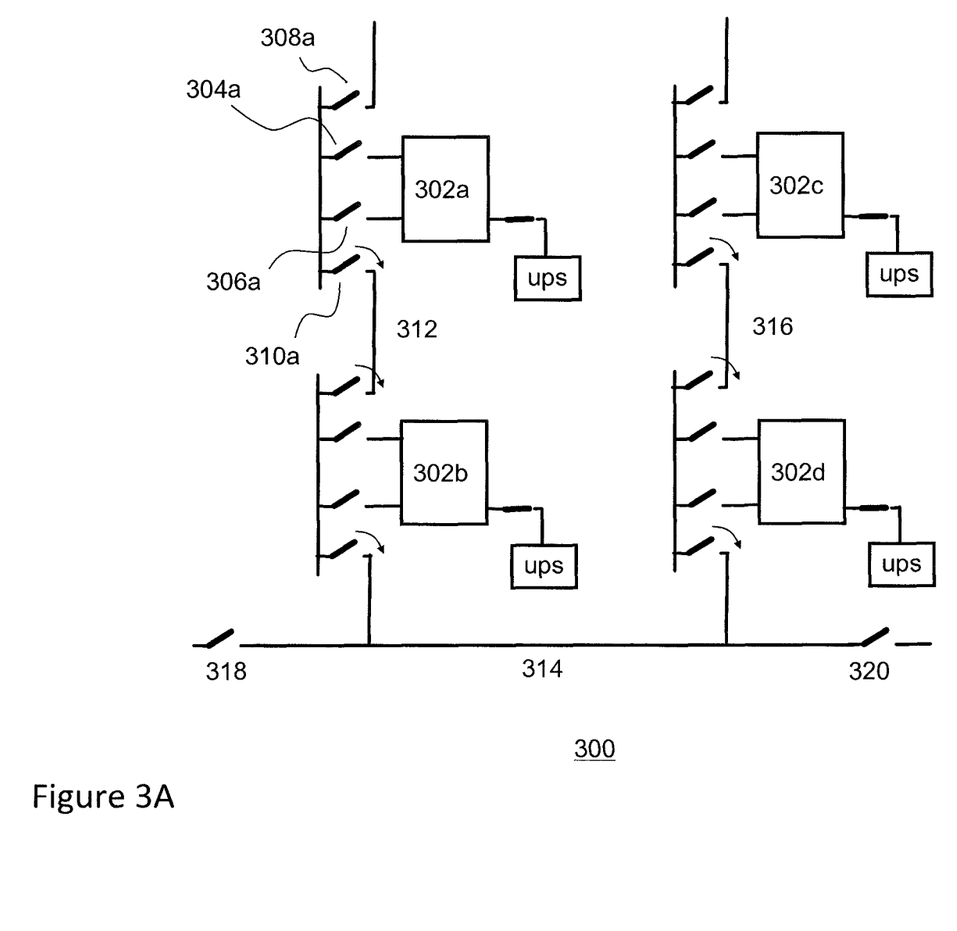
FIG. 3A-3C illustrates the process of an exemplary island operation in a wind farm system according to one embodiment of the invention.
Figure 3B:
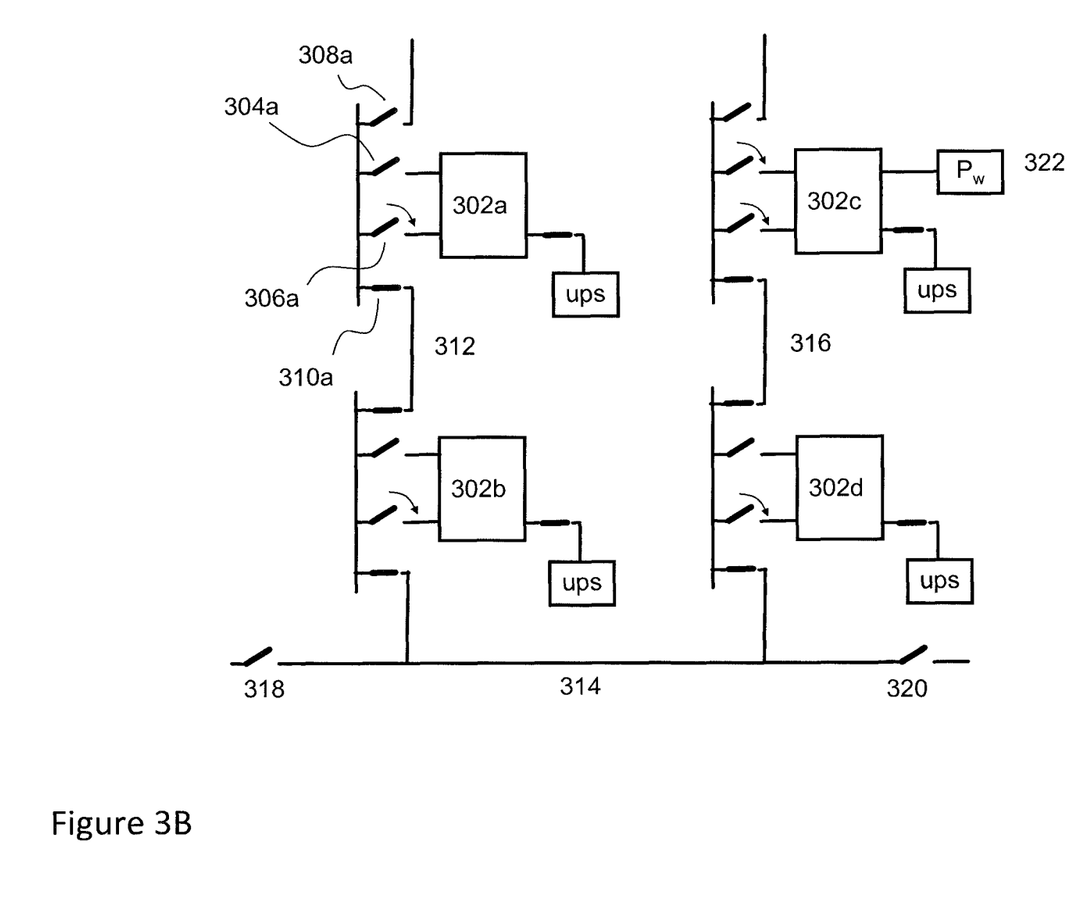
Figure 3C:
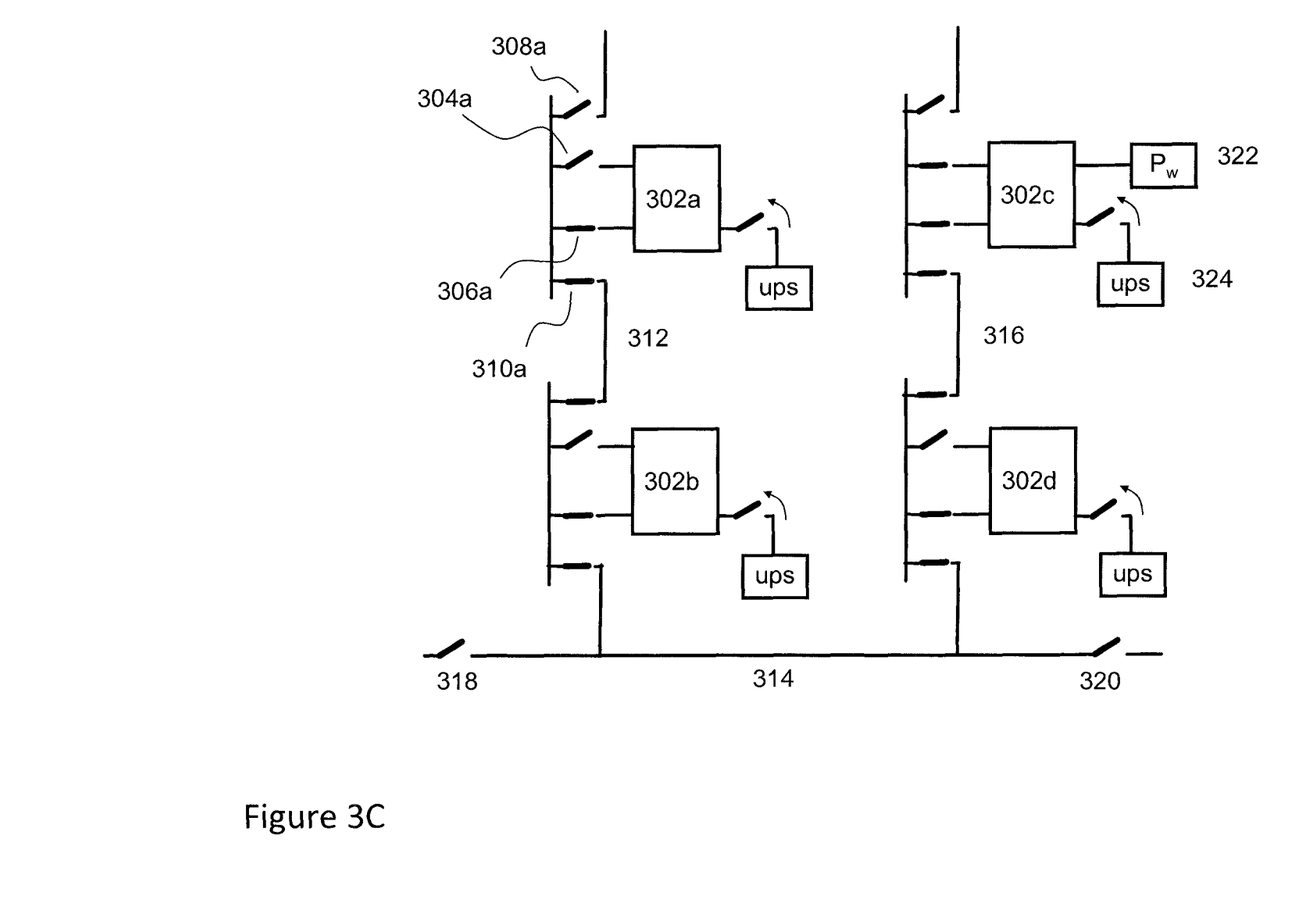
Figure 4:
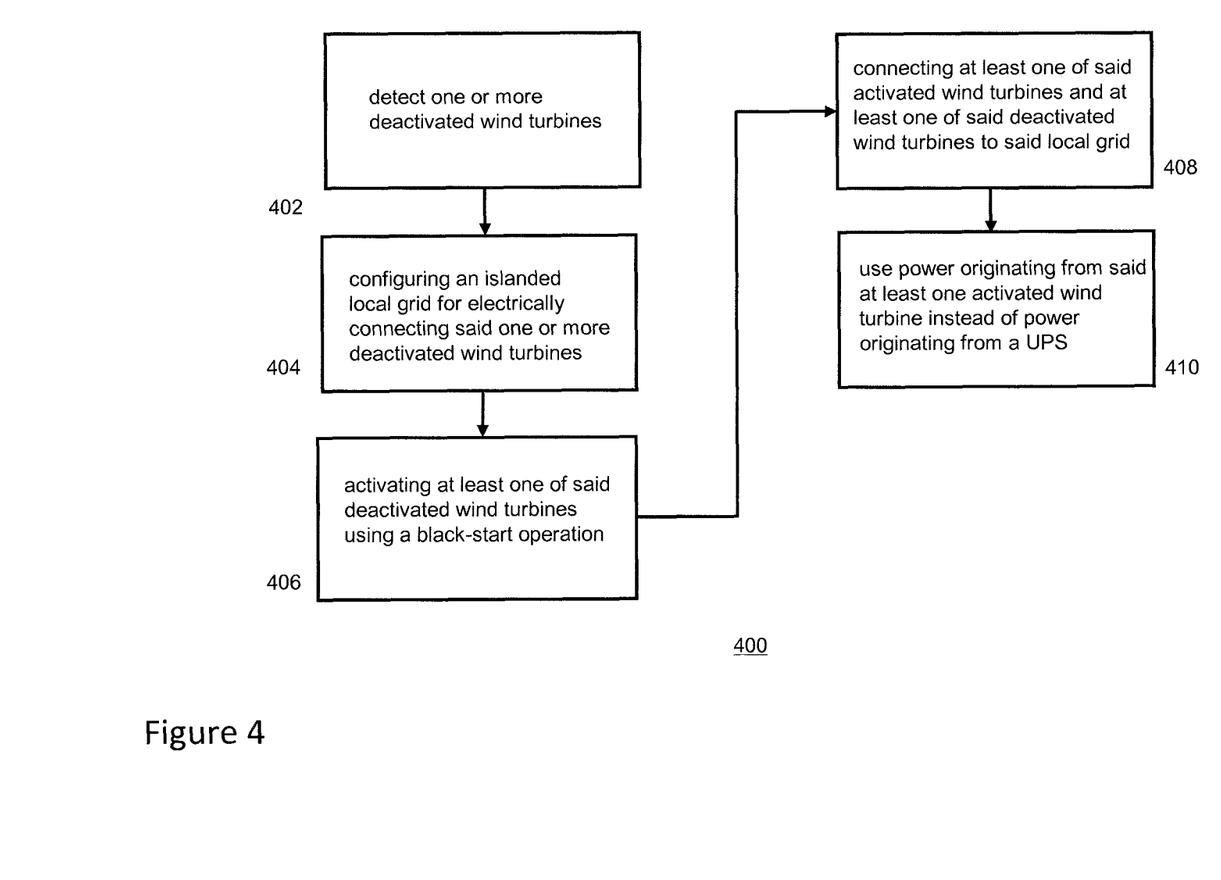
FIG. 4 depicts the process of an island operation according to one embodiment of the invention.

FIGS. 3A-3C and FIG. 4 schematically depict a process of island operation according to one embodiment of the invention. In particular, FIGS. 3A-3C depicts an exemplary island operation of a group of four wind turbines associated with a wind farm. FIG. 3A schematically illustrates four wind turbines 302a-302d, which may have been deactivated after a power fault or a controlled shut down (either autonomously by one or more wind turbine controllers or by the wind farm controller). Each deactivated wind turbine is isolated from the grid by opening main switches 304a-304d, grid switches 306a-306d and secondary switches 308a-308d, 310a-310d and each deactivated wind turbine is kept in standby operation by using its own UPS, which is switchable connected to the wind turbine.

After detection of the power failure or controlled closure, the IMCU may detect and locate deactivated wind turbines and starts a process of reconfiguring the local grid by sequentially closing secondary switches 308b, 308d, 310a-310d of the deactivated wind turbines (the closing of the switches is symbolically denoted by an arrow). After closing said switches an islanded local grid is formed by interconnected power transmission lines 312,314,316, wherein the local grid is disconnected (i.e. not connected and/or electrically isolated) from the main grid as the switches 318,320 in the main transmission line are in the open position.

FIG. 3B illustrates a second phase of the island operation process. After formation of the islanded local grid, the IMCU selects one of the deactivated wind turbines 302c and instructs the selected wind turbine 302c to initiate a black-start procedure. During a black start a wind turbine is restored to operation without relying on external energy sources. Instead, the wind turbine uses its own UPS (e.g. a battery and/or a diesel generator) to pitch the wind blades out of the vane position and to gradually increase the power operation of wind turbine until stable open-circuit operation (e.g. 10 kV/50 Hz) is achieved.

Once stable operation is achieved, the IMCU connects the operational wind generator 322 to the local grid by remotely closing main switch 304c of the operational wind generator. Further, the IMCU connects the auxiliary power distribution system of the operational wind turbine 302c and a first deactivated wind turbine 302d to the local grid by remotely closing the local grid switches 306c,306d of the operational wind turbine and the deactivated wind turbine respectively. In a similar way, the IMCU sequentially connects the other deactivated wind turbines 302a,302b to the local grid, which is powered by the operational wind turbine 302c.

The IMCU thus connects the auxiliary power distribution systems of the individually isolated and deactivated wind generators to the operational wind turbine thereby forming an islanded group of deactivated wind turbines wherein the wind turbine controllers and/or other electrical elements e.g. the environmental control system in the wind turbine are powered by one operational wind turbine. The operational wind turbine thus acts as an auxiliary power supply $P_w$. If the power generated by the activated operational wind turbine is sufficiently large, each deactivated wind turbine having its auxiliary power distribution system connected to the islanded local grid, may use the power supplied by the activated wind turbine instead of the power provided by its UPS. Hence, in one embodiment, the IMCU may optionally instruct the wind turbine controllers to stop using power supplied by the UPS. This process is symbolically depicted in FIG. 3C.

Provided that suitable wind conditions are available, the method thus provides an efficient and cheap way of supplying power to an islanded group of wind turbines which is required to keep the wind turbines in the standby mode. Using the island operation process, a 4 MW wind turbine may for example power feed twenty deactivated wind turbines (each requiring 200 kW in the standby mode). The method is especially effective when deactivation of large groups of wind turbines over a longer period is necessary, for example during submarine power transmission line defects or maintenance thereof. Moreover, the method reduces the necessity of using combustion type generators.

In case of a large group of deactivated wind turbines the IMCU may decide that activation of one or more further wind turbines is necessary. The IMCU may select for example two operational wind turbines, wherein each of the wind turbines is located such that the power load of the two operative wind turbines are shared.

In a further variant, one or more wind turbine controllers are configured to autonomously initiate island operation of a group of deactivated wind turbines as described with reference to FIG. 3A-3C. In that variant, the IMCU is located in one or more wind turbine controllers instead of the wind farm controller.

In further variants, the methods and systems described with reference to FIG. 1-4 may be used to operate two or more islanded local grids, wherein each islanded local grid connects one or more deactivated wind turbines to at least one activated wind turbine.

It is to be understood that any feature described in relation to any one embodiment may be used alone, or in combination with other features described, and may also be used in combination with one or more features of any other of the embodiments, or any combination of any other of the embodiments. Moreover, it is noted that it is clear for the skilled person that the sequence of process steps, in particular the steps of configuring the local grid, the steps of connecting the activated and/or deactivated wind turbines to the local grid and disconnecting the UPS from auxiliary power distribution system described with reference to FIG. 3A-3C may be altered in various ways without departing from the scope of the invention. Further equivalents and modifications not described above may also be employed without departing from the scope of the invention, which is defined in the accompanying claims.

The invention claimed is:

1. A method for island operation of at least two wind turbines associated with a wind farm, said wind farm being configured for providing power generated by wind turbines in said wind farm to a main grid, the method comprising:
    detecting at least two or more deactivated wind turbines in said wind farm, said deactivated wind turbines being disconnected from said main grid;
    configuring at least one islanded local grid to electrically connect said two or more deactivated wind turbines;
    activating at least one of said deactivated wind turbines using a black start operation; and
    connecting said at least one activated wind turbine and at least one of said deactivated wind turbines to said local grid, said activated wind turbine acting as a power supply for said at least one deactivated wind turbine connected to said local grid.

2. The method according to claim 1, comprising:
    configuring said local grid by controlling one or more first switches in one or more power transmission lines between said deactivated wind turbines.

3. The method according to claim 1, comprising:
    coupling said at least one activated wind turbine and at least one of said deactivated wind turbines to said local grid by controlling one or more second switches thereby providing an electrical connection between said local grid and said at least one activated and deactivated wind turbine respectively.

4. The method according to claim 1, wherein each of said wind turbines comprises a wind generator, said method comprising:
    connecting the wind generator of at least one of said activated wind turbines to said local grid using one or more third switches.

5. The method according to claim 1, wherein each of said wind turbines comprises an auxiliary power distribution system and an uninterruptable power supply.

6. The method according to claim 5, comprising:
    providing power generated by at least one of said activated wind turbines to said auxiliary power distribution system instead of using power associated with said uninterruptable power supply.

7. The method according to claim 1, wherein at least one of said wind turbines comprises a wind turbine controller, said wind turbine controller being configured for executing at least one process step as defined in claim 1.

8. The method according to claim 1, wherein each of said wind turbines comprises a wind turbine controller, said wind turbine controllers being connected via one or more communications links to a wind farm controller configured for executing at least one process step as defined in claim 1.

9. The method according to claim 1, wherein each of said deactivated turbines comprises a turbine in a standby mode.

10. The method according to claim 1, wherein configuring at least one islanded local grid to electrically connect said two or more deactivated wind turbines takes place prior to activating at least one of said deactivated wind turbines using the black start operation.

11. A controller for island operation of at least two wind turbines associated with a wind farm, said wind farm being configured for providing power generated by wind turbines in said wind farm to a main grid, the controller comprising:
one or more detectors configured to detect electrical isolation of a wind turbine in said wind farm from the main grid and/or deactivation of a wind turbine in said wind farm;
a local grid controller configured to configure a local grid being electrically isolated from the main grid, wherein said local grid controller comprises a first switch controller configured to control one or more first switches in one or more power transmission lines between wind turbines identified by said one or more detectors;
a wind turbine activator configured to activate at least one deactivated wind turbines using a black start operation; and
a grid coupler configured to couple an activated wind turbine and at least one deactivated wind turbine to the local grid.

12. The controller according to claim 11, wherein each of said deactivated turbines comprises a turbine in a standby mode.

13. The controller according to claim 11, wherein the local grid controller is configured to configure the local grid to be electrically isolated from the main grid prior to the wind turbine activator activating at least one of said deactivated wind turbines using the black start operation.

14. A controller for island operation of at least two wind turbines associated with a wind farm, said wind farm being configured for providing power generated by wind turbines in said wind farm to a main grid, the controller comprising:
one or more detectors configured to detect electrical isolation of a wind turbine in said wind farm from the main grid and/or deactivation of a wind turbine in said wind farm;
a local grid controller configured to configure a local grid being electrically isolated from the main grid;
a wind turbine activator configured to activate at least one deactivated wind turbines using a black start operation; and,
a grid coupler configured to couple an activated wind turbine and at least one deactivated wind turbine to the local grid, wherein said grid coupler comprises a second switch controller configured to control one or more second switches for providing an electrical connection between said local grid and activated and deactivated wind turbines respectively.

15. A controller for island operation of at least two wind turbines associated with a wind farm, said wind farm being configured for providing power generated by wind turbines in said wind farm to a main grid, the controller comprising:
one or more detectors configured to detect electrical isolation of a wind turbine in said wind farm from the main grid and/or deactivation of a wind turbine in said wind farm;
a local grid controller configured to configure a local grid being electrically isolated from the main grid;
a wind turbine activator configured to activate at least one deactivated wind turbines using a black start operation;
a grid coupler configured to couple an activated wind turbine and at least one deactivated wind turbine to the local grid; and
a receiver/transmitter unit configured to establish a communications link with at least one deactivated wind turbine disconnected from the main grid or with a wind farm controller.

16. A wind farm system configured for providing power generated by wind turbines in said wind farm system to a main grid, said wind farm system further configured to manage island operation of at least two deactivated wind turbines in said wind farm system, said at least two deactivated wind turbines being disconnected from the main grid, the wind farm system comprising a plurality of wind turbines switchably connected through one or more power transmission lines to a main grid and at least one controller comprising:
one or more detectors configured to detect electrical isolation of a wind turbine in said wind farm from the main grid and/or deactivation of a wind turbine in said wind farm;
a local grid controller configured to configure a local grid being electrically isolated from the main grid, wherein said local grid controller comprises a first switch controller configured to control one or more first switches in one or more power transmission lines between wind turbines identified by said one or more detectors;
a wind turbine activator configured to activate at least one deactivated wind turbines using a black start operation; and
a grid coupler configured to couple an activated wind turbine and at least one deactivated wind turbine to the local grid.

* * * * *